United States Patent
Slovak et al.

(10) Patent No.: US 11,930,088 B2
(45) Date of Patent: *Mar. 12, 2024

(54) CONFIGURATION OF CONTENT SITE USER INTERACTION MONITORING IN DATA NETWORKS

(71) Applicant: Tealium Inc., San Diego, CA (US)

(72) Inventors: Christopher B. Slovak, Carlsbad, CA (US); Michael Anderson, Carlsbad, CA (US)

(73) Assignee: Tealium Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,443

(22) Filed: Mar. 31, 2023

(65) Prior Publication Data
US 2023/0353650 A1 Nov. 2, 2023

Related U.S. Application Data

(63) Continuation of application No. 17/722,181, filed on Apr. 15, 2022, now Pat. No. 11,622,019, which is a continuation of application No. 17/091,431, filed on Nov. 6, 2020, now Pat. No. 11,310,327, which is a continuation of application No. 16/670,723, filed on Oct. 31, 2019, now Pat. No. 10,834,216, which is a continuation of application No. 16/164,003, filed on
(Continued)

(51) Int. Cl.
*H04L 67/50* (2022.01)
*G06F 11/34* (2006.01)
*G06Q 30/0201* (2023.01)
*H04L 41/22* (2022.01)
*H04L 67/00* (2022.01)
*H04L 67/02* (2022.01)

(52) U.S. Cl.
CPC ........ *H04L 67/535* (2022.05); *G06F 11/3438* (2013.01); *G06Q 30/0201* (2013.01); *H04L 41/22* (2013.01); *H04L 67/02* (2013.01); *H04L 67/34* (2013.01)

(58) Field of Classification Search
CPC .................................................... H04L 67/535
See application file for complete search history.

(56) References Cited

U.S. PATENT DOCUMENTS

| 6,393,479 B1 | 5/2002 | Glommen et al. |
| 7,039,599 B2 | 5/2006 | Merriman et al. |

(Continued)

OTHER PUBLICATIONS

Floodlight Tag Format—DFA Partner Help, https://support.google.com/dfa/partner/answer/154049, accessed on Apr. 13, 2016, in 5 pages.

*Primary Examiner* — Brendan Y Higa
(74) *Attorney, Agent, or Firm* — Knobbe, Martens, Olson & Bear, LLP

(57) ABSTRACT

A collection configuration management system can be used to manage one or more monitoring objects, such as tags, included in one or more content objects. The collection configuration management system can compartmentalize monitoring object configurations into a monitoring object bundle that may be executed as a result of loading the one or more content objects. The monitoring object bundle can be generated to include one or more monitoring objects, as well as monitoring object management loader functionality.

20 Claims, 11 Drawing Sheets

Related U.S. Application Data

Oct. 18, 2018, now Pat. No. 10,476,977, which is a continuation of application No. 15/795,593, filed on Oct. 27, 2017, now Pat. No. 10,110,690, which is a continuation of application No. 15/612,159, filed on Jun. 2, 2017, now Pat. No. 9,807,184.

(60) Provisional application No. 62/344,785, filed on Jun. 2, 2016.

(56) References Cited

U.S. PATENT DOCUMENTS

| | | |
|---|---|---|
| 7,085,682 B1 | 8/2006 | Heller et al. |
| 7,349,827 B1 | 3/2008 | Heller et al. |
| 7,523,191 B1 * | 4/2009 | Thomas .............. G06F 11/3476 709/224 |
| 7,610,276 B2 | 10/2009 | Yomtobian |
| 7,844,488 B2 | 11/2010 | Merriman et al. |
| 8,060,601 B1 * | 11/2011 | Brown ............... G06Q 30/0277 709/224 |
| 8,713,536 B2 | 4/2014 | Everly et al. |
| 8,805,946 B1 | 8/2014 | Glommen et al. |
| 8,843,827 B2 | 9/2014 | Koo et al. |
| 8,904,278 B1 | 12/2014 | Anderson et al. |
| 8,990,298 B1 | 3/2015 | Anderson |
| 9,081,789 B2 | 7/2015 | Amderson |
| 9,363,311 B1 | 6/2016 | McWilliams et al. |
| 9,537,964 B2 | 1/2017 | Glommen et al. |
| 9,553,918 B1 | 1/2017 | Manion et al. |
| 9,614,927 B2 | 4/2017 | Hammond |
| 9,654,360 B1 | 5/2017 | Kellicker |
| 9,807,184 B1 | 10/2017 | Slovak |
| 11,373,204 B2 * | 6/2022 | Ng ........................ H04L 67/535 |
| 2002/0147570 A1 | 10/2002 | Kraft |
| 2002/0165954 A1 | 11/2002 | Eshghi et al. |
| 2004/0088212 A1 | 5/2004 | Hill |
| 2007/0027754 A1 | 2/2007 | Collins |
| 2007/0250618 A1 | 10/2007 | Hammond |
| 2008/0228910 A1 | 9/2008 | Petri |
| 2009/0240698 A1 | 9/2009 | Shukla |
| 2009/0282062 A1 | 11/2009 | Husic |
| 2010/0095208 A1 | 4/2010 | White |
| 2010/0169792 A1 | 7/2010 | Ascar et al. |
| 2010/0318976 A1 | 12/2010 | Everly et al. |
| 2013/0132833 A1 | 5/2013 | White |
| 2013/0304906 A1 | 11/2013 | Yavilevich |
| 2014/0040786 A1 | 2/2014 | Swanson |
| 2014/0120864 A1 | 5/2014 | Manolarakis |
| 2014/0180829 A1 | 6/2014 | Umeda |
| 2014/0223005 A1 | 8/2014 | Everly et al. |
| 2014/0244830 A1 | 8/2014 | Smacinih |
| 2014/0278748 A1 | 9/2014 | Shottan |
| 2014/0281913 A1 | 9/2014 | Saeta et al. |
| 2014/0282036 A1 | 9/2014 | Shottan |
| 2015/0066587 A1 | 3/2015 | Glommen |
| 2015/0134669 A1 | 5/2015 | Harris et al. |
| 2015/0154631 A1 | 6/2015 | Umeda |
| 2015/0154650 A1 | 6/2015 | Umeda |
| 2015/0317348 A1 | 11/2015 | Walter |
| 2016/0092914 A1 | 3/2016 | Wiener |
| 2016/0267524 A1 | 9/2016 | Ng |

\* cited by examiner

Acme Tag Settings: Acme

Tag Configuration
Configuration your tag settings

Load Rules
Conditionally land your tag

Data Mappings
Fuel your tag with data

Acme

Tips
Use mapping to override the standard config values or to p additional parameters ☐ Load on All Pages ☑ [ON] Campaign 1234    ☑ Edit   🗐 Copy   ⊞ Deactivate   🗑 Delete IF    js .Ad_Server CONTAINS Ace
    AND js .Campaign_ID CONTAINS 1234

☐ [ON] Confirmation Page Only
☐ [ON] Only Run if Company 1 ID is not Defined
☐ [ON] Only Run when Company 2 ID is not set
☐ [ON] Visitor Split value of "a" only
☐ [ON] Visitor Split value of "b" only + Create Rule

[Cancel]     [Next] [Finish]

CONFIGURATION OF CONTENT SITE USER INTERACTION MONITORING IN DATA NETWORKS

RELATED APPLICATIONS

Any and all applications for which a domestic priority claim is identified in the Application Data Sheet of the present application are hereby incorporated by reference under 37 CFR 1.57.

BACKGROUND

Some operators of content sites, such as websites, regularly obtain the results of analytics performed with regard to user interactions on their content sites. User analytics can include any type of data regarding interactions of end users with content sites, among other types of data. There are different approaches to gathering analytics data, one of which includes employing the use of tags.

Tags can include small pieces of website code that allow a website operator to measure traffic and visitor behavior, understand the impact of online advertising and social channels, use remarketing and audience targeting, or test and improve a content site, among optionally other functions. Adding tags to a content site has typically required involving a developer to manually insert tag code into one or more pages of a website.

SUMMARY

In some embodiments, a system is disclosed that controls collection of data indicative of user interactions with a content page and transmits the data indicative of the user interactions over a computer network. The system can include: one or more memory devices configured to store content organization data, the content organization data comprising a plurality of identifiers associated with a plurality of content objects including a first content object and a second content object, an identifier of the plurality of identifiers being associated with the first content object and the second content object; and one or more hardware processors in communication with the one or more memory devices, the one or more hardware processors being configured to: identify a selection event indicative of the identifier rather than the plurality of identifiers other than the identifier, in response to identifying the selection event, generate monitoring object data usable to generate a monitoring object bundle, the monitoring object bundle comprising instructions that when executed by a user system cause the user system to: gather interaction data indicative of user interactions with the first content object or the second content object, and transmit the interaction data via a computer network to a computing system, generate the monitoring object bundle from the monitoring object data, receive a bundle request from the user system via the computer network, the bundle request identifying the identifier, the bundle request being transmitted by the user system in response to the user system loading a content page that causes loading of the first content object or the second content object, and in response to receiving the bundle request, transmit the monitoring object bundle to the user system via the computer network causing the user system to gather the interaction data and transmit the interaction data via the computer network to the computing system.

The system of the preceding paragraph can include one or more of the following features: The one or more hardware processors is configured to: generate the monitoring object bundle in response to the identifying the selection event; store the monitoring object bundle in the one or more memory devices; and access the monitoring object bundle from the one or more memory devices using the identifier in response to receiving the bundle request. The one or more hardware processors is configured to identify the selection event based at least on a user input via a user interface, and the user input denotes (i) the identifier, (ii) the first content object and the second content object, or (iii) a content object group comprising the first content object and the second content. The monitoring object bundle comprises a plurality of monitoring objects, and the instructions when executed by the user system cause the user system to load the plurality of monitoring objects without first determining whether a monitoring object load condition at the user system has been satisfied. Execution of the monitoring object bundle by the user system does not cause the user system to request one or more monitoring objects via the computer network. The one or more hardware processors is configured to receive the content organization data from a content object server. The one or more hardware processors is configured to: generate and output a user interface configured to receive a user input comprising authentication data for the content object server, and transmit a first request with the authentication data to the content object server to obtain the content organization data. The monitoring object bundle is a data file comprising script language, and the first content object comprises a first image or a first video and the second content object comprises a second image or a second video. The content page comprises the first content object or the second object, and the instructions when executed by the user system further cause the user system to gather interaction data indicative of user interactions with a portion of the content page other than the first content object or the second content object. Execution of the monitoring object bundle by the user system does not cause the user system to perform the same data collection function twice while gathering the interaction data. The identifier is not associated with the plurality of content objects other than the first content object and the second content object. The one or more hardware processors is configured to generate the monitoring object bundle in response to receiving the bundle request. The instructions when executed by the user system cause the user system to perform a monitoring object management loader operation and transmit the interaction data via the computer network to a plurality of computing systems including the computing system.

In some embodiments, a method of controlling collection of data indicative of user interactions with a content page is disclosed. The method can include: under control of a physical computing device comprising digital logic circuitry: identifying a selection event indicative of an identifier of a plurality of identifiers, the plurality of identifiers being associated with a plurality of content objects including a first content object and a second content object, the identifier being associated with the first content object and the second content object; in response to identifying the selection event, generating monitoring object data usable to generate a monitoring object bundle, the monitoring object bundle comprising instructions that when executed by a user system cause the user system to: gather interaction data indicative of user interactions with the first content object or the second content object, and transmit the interaction data via a computer network; generating the monitoring object bundle from the monitoring object data; receiving a bundle request from the user system via the computer network, the bundle request identifying the identifier; and in response to receiving the bundle request, transmitting the monitoring object bundle to the user system via the computer network causing the user system to gather the interaction data and transmit the interaction data via the computer network.

The method of the preceding paragraph can include one or more of the following features: The method can include: under control of the physical computing device: generating the monitoring object bundle in response to the identifying the selection event; storing the monitoring object bundle in one or more memory devices; and accessing the monitoring object bundle from the one or more memory devices using the identifier in response to receiving the bundle request, wherein the selection event is identified based at least on a user input via a user interface, and the user input denotes (i) the identifier, (ii) the first content object and the second content object, or (iii) a content object group comprising the first content object and the second content. The method can include: under control of the physical computing device: transmitting a first request to a content object server to obtain the plurality of identifiers associated with the plurality of content objects; and receiving the plurality of identifiers associated with the plurality of content objects from the content object server in response to the first request.

In some embodiments, non-transitory physical computer storage is discloses that includes computer-executable instructions stored thereon that, when executed by one or more processors, are configured to implement a process. The process can include: identifying a selection event indicative of an identifier of a plurality of identifiers rather than the plurality of identifiers other than the identifier, the plurality of identifiers being associated with a plurality of content objects including a first content object and a second content object, the identifier being associated with the first content object and the second content object; in response to identifying the selection event, generating monitoring object data usable to generate a monitoring object bundle, the monitoring object bundle comprising monitoring instructions that when executed by a user system cause the user system to: gather interaction data indicative of user interactions with the first content object or the second content object, and transmit the interaction data to a computing system; generating the monitoring object bundle from the monitoring object data; receiving a bundle request from the user system, the bundle request identifying the identifier; and in response to receiving the bundle request, transmitting the monitoring object bundle to the user system causing the user system to gather the interaction data and transmit the interaction data to the computing system.

The non-transitory physical computer storage of the preceding paragraph can include one or more of the following features: The process further comprises generating the monitoring object bundle in response to the identifying the selection event; storing the monitoring object bundle in one or more memory devices; and accessing the monitoring object bundle from the one or more memory devices using the identifier in response to receiving the bundle request. The process further comprises generating the monitoring object bundle in response to receiving the bundle request. The process further comprises: transmitting a first request to a content object server to obtain the plurality of identifiers associated with the plurality of content objects; and receiving the plurality of identifiers associated with the plurality of content objects from the content object server in response to the first request.

In some embodiments, a method of controlling collection of data indicative of user interactions with a content page is disclosed. The method can include: under control of one or more hardware processors: identifying a selection event indicative of an identifier of a plurality of identifiers, the plurality of identifiers being associated with a plurality of content objects including a first content object and a second content object, the identifier being associated with the first content object and the second content object; generating monitoring object data usable to generate a monitoring object bundle corresponding to the identifier, the monitoring object bundle comprising instructions that when executed by a user system cause the user system to: perform a monitoring object management loader operation, gather interaction data indicative of user interactions with the first content object or the second content object, and transmit the interaction data via a computer network; and generating the monitoring object bundle from the monitoring object data so that execution of the monitoring object bundle by the user system does not cause the user system to perform the same data collection function twice while gathering the interaction data.

The method of the preceding paragraph can include one or more of the following features: The generating the monitoring object bundle comprises generating the monitoring object bundle from the monitoring object data by removing one or more redundant operations indicated by a plurality of monitoring objects associated with the monitoring object bundle. The selection event is identified based at least on a user input via a user interface, and the user input denotes (i) the identifier, (ii) the first content object and the second content object, or (iii) a content object group comprising the first content object and the second content. The monitoring object bundle comprises a plurality of tags.

In some embodiments, a method of controlling collection of data indicative of user interactions with a content page is disclosed. The method can include: under control of one or more hardware processors: receiving a bundle request from a user system via a computer network in response to the user system loading a content page that causes loading of a first content object or a second content object, the bundle request identifying an identifier of a plurality of identifiers, the plurality of identifiers being associated with a plurality of content objects including the first content object and the second content object, the identifier being associated with the first content object and the second content object; processing the bundle request for the identifier; accessing a monitoring object bundle from one or more memory devices using the identifier identified by the bundle request, the monitoring object bundle comprising instructions that when executed by the user system cause the user system to: gather interaction data indicative of user interactions with the first content object or the second content object, and transmit the interaction data to a computing system; and transmitting the monitoring object bundle to the user system via the computer network causing the user system to gather the interaction data and transmit the interaction data to the computing system. The bundle request can include the identifier.

In some embodiments, a system for collecting data indicative of user interactions with a content page and transmitting the data indicative of the user interactions over a computer network is disclosed. The system can include: one or more memory devices configured to store a plurality of content pages and a plurality of content objects; and one or more hardware processors in communication with the one or more memory devices, the one or more hardware processors being configured to: load a first content page of the plurality of content pages that causes loading of a first content object of the plurality of content objects as part of the first content page, the plurality of content objects including the first content object and a second content object, the first content object and the second content object being associated with an identifier of a plurality of identifiers; in response to loading the first content object, generate a first bundle request that identifies the identifier; transmit the first bundle request via a computer network to a server; receive a monitoring object bundle from the server via the computer network in response to transmitting the first bundle request, the monitoring object bundle comprising instructions that when executed by the one or more hardware processors cause the one or more hardware processors to: gather interaction data indicative of user interactions with one or more of the plurality of content objects, and transmit the interaction data to a computing system via the computer network; execute the monitoring object bundle to cause the one or more hardware processors to gather first interaction data indicative of first user interactions with the first content object and transmit the first interaction data to the computing system via the computer network; load a second content page of the plurality of content pages that causes loading of the second content object as part of the second content page; in response to loading the second content object, generate a second bundle request that identifies the identifier; transmit the second bundle request via the computer network to the server; receive the monitoring object bundle from the server via the computer network in response to transmitting the second bundle request; and execute the monitoring object bundle to cause the one or more hardware processors to gather second interaction data indicative of second user interactions with the second content object and transmit the second interaction data to the computing system via the computer network.

The system of the preceding paragraph can include one or more of the following features: The instructions when executed by the one or more hardware processors do not cause the one or more hardware processors to gather user data indicative of user interactions with page elements other than the plurality of content objects. The one or more hardware processors is configured to load the first content page and the second content page by loading the first content page and the second content page in a browser. The first content page and the second content page comprise a first web page and a second web page. The monitoring object bundle comprises a tag including the instructions. The instructions when executed by the one or more hardware processors cause the one or more hardware processors to perform a monitoring object management loader operation.

In some embodiments, a method of collecting data indicative of user interactions with a content page and transmitting the data indicative of the user interactions over a computer network is disclosed. The method can include: under control of one or more hardware processors: loading a first content object as part of loading a first content page, the first content object being associated with an identifier; generating a first bundle request from loading the first content object, the first bundle request identifying the identifier; transmitting the first bundle request to a server; receiving a monitoring object bundle from the server, the monitoring object bundle being associated with the identifier and comprising instructions that when executed by the one or more hardware processors cause the one or more hardware processors to: gather interaction data indicative of user interactions, and transmit the interaction data; executing the monitoring object bundle causing the one or more hardware processors to gather first interaction data indicative of a first user interaction with the first content object and transmit the first interaction data to a computing system; loading a second content object different from the first content object as part of loading a second content page different from the first content page, the second content object being associated with the identifier; generating a second bundle request from loading the second content object, the second bundle request identifying the identifier; transmitting the second bundle request to the server; and executing the monitoring object bundle causing the one or more hardware processors to gather second interaction data indicative of a second user interaction with the second content object and transmit the second interaction data to the computing system.

The method of the preceding paragraph can include one or more of the following features: The first content page is part of a first content site, and the second content page is part of a second content site different from the first content site. The first content page is part of a content site, and the second content page is part of the same content site. The executing the monitoring object bundle does not cause the one or more hardware processors to gather user data indicative of user interactions with page elements other than the plurality of content objects. The method can further includes: under control of the one or more hardware processors: executing the monitoring object bundle causing the one or more hardware processors to gather page element interaction data indicative of a page element user interaction with a page element of the first content page other than the first content object and transmit the page element interaction data to the computing system. The executing the monitoring object bundle does not cause the one or more hardware processors to perform the same data collection function twice while gathering the first interaction data. The first content object comprises the identifier, and the second content object comprises the identifier. The first content object comprises a first image or a first video, and the second content object comprises a second image or a second video. The monitoring object bundle comprises a plurality of tags including the instructions. The method can further includes: under control of the one or more hardware processors: loading a third content object different from the first content object and the second content object as part of loading a third content page different from the first content page and the second content page, the third content object being associated with the identifier; generating a third bundle request from loading the third content object, the third bundle request identifying the identifier; transmitting the third bundle request to the server; and executing the monitoring object bundle causing the one or more hardware processors to gather third interaction data indicative of a third user interaction with the third content object and transmit the third interaction data to the computing system. The transmitting the first bundle request comprises transmitting the first bundle request via a computer network. The receiving the monitoring object bundle comprises receiving the monitoring object bundle via the computer network. The first interaction data is transmitted via the computer network. The transmitting the second bundle request comprises transmitting the second bundle request via the computer network. The second interaction data is transmitted via the computer network. The loading the first content object comprises loading the first content object in a browser, and the loading the second content object comprises loading the second content object in the browser. The first user interaction comprises a user selection of the first content object with an input device.

In some embodiments, non-transitory physical computer storage comprising computer-executable instructions stored thereon that, when executed by one or more processors, are configured to implement a process is disclosed. The process can include: generating a first bundle request from loading a first content object, the first bundle request identifying an identifier associated with the first content object; transmitting the first bundle request to a server; receiving a monitoring object bundle from the server, the monitoring object bundle being associated with the identifier and comprising instructions that when executed by the one or more processors cause the one or more processors to: gather interaction data indicative of user interactions, and transmit the interaction data; executing the monitoring object bundle causing the one or more processors to gather first interaction data indicative of first user interactions with the first content object and transmit the first interaction data to a computing system; loading a second content object associated with the identifier, the second content object being different from the first content object; generating a second bundle request from loading the second content object, the second bundle request identifying the identifier; transmitting the second bundle request to the server; and executing the monitoring object bundle causing the one or more hardware processors to gather second interaction data indicative of second user interactions with the second content object and transmit the second interaction data to the computing system.

The non-transitory physical computer storage of the preceding paragraph can include one or more of the following features: The process further comprises: accessing and loading a first content page from a first domain, the first content page comprising a reference to the first content object; and accessing and loading a second content page from a second domain different from the first domain, the second content page comprising a reference to the second content object. The process further comprises: accessing and loading a first content page from a domain, the first content page comprising a reference to the first content object; and accessing and loading a second content page from the same domain, the second content page comprising a reference to the second content object. The first content object and the second content object each comprises the identifier. The first content object and the second content object each comprises an image or a video. The executing the monitoring object bundle does not cause the one or more processors to perform the same data collection function twice while gathering the first interaction data.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIGS. 5A, 5B, 6A, and 6B depict example collection management user interfaces.

DETAILED DESCRIPTION

I. Monitoring Object Management Introduction

Figure 1:
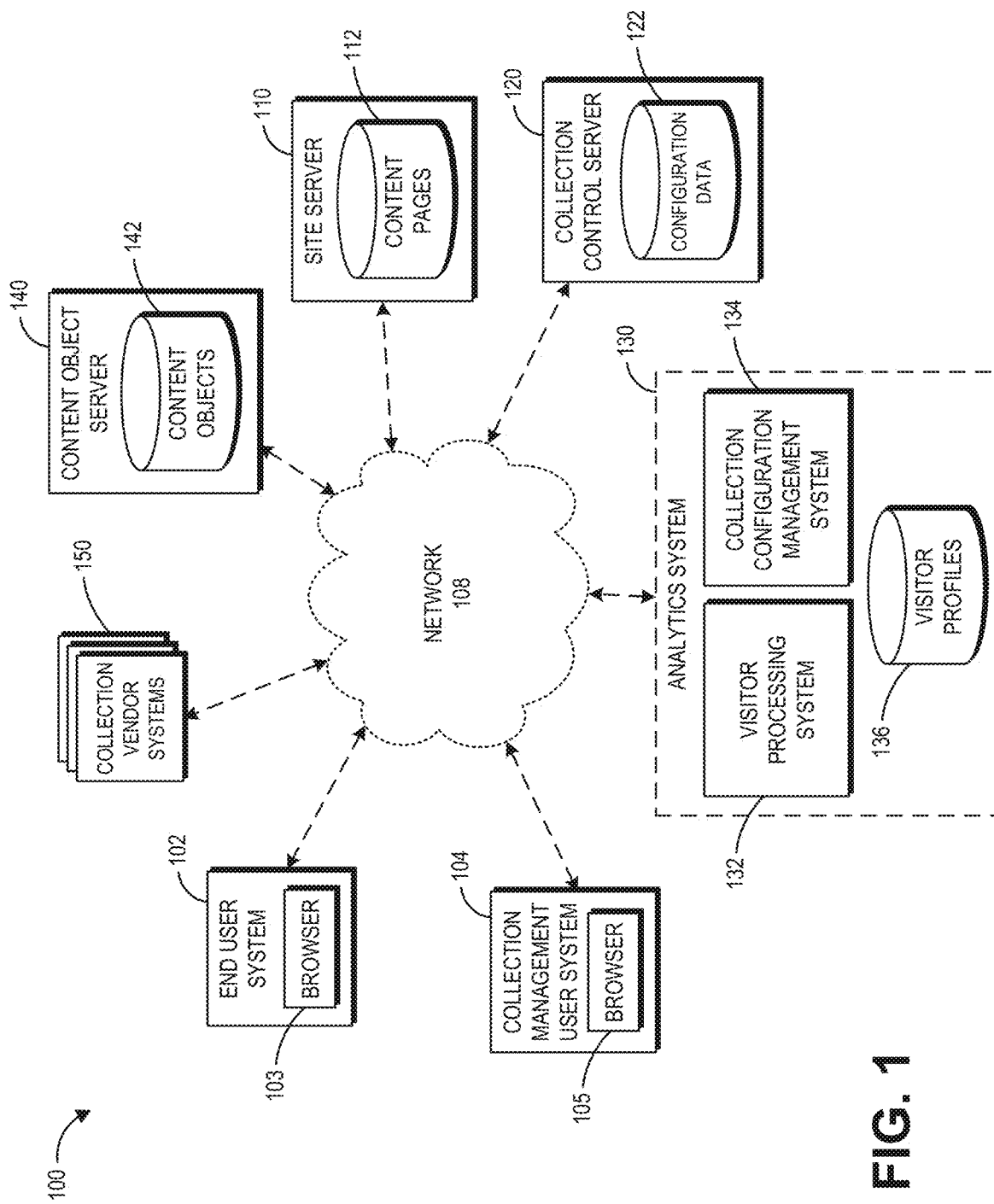
FIG. 1 depicts an example computing environment for managing the collection of user interaction data.

Adding monitoring objects, such as tags, to web pages without efficient management can create significant problems and inconveniences. For instance, code (sometimes referred to as instructions) associated with multiple monitoring objects can bog down a content site and can be a major performance drain. Redundant or incorrectly applied monitoring objects can also distort measurements and result in duplicate costs or missing data. Poor monitoring object management can also be time consuming for an information technology (IT) department or webmaster team to add new monitoring objects, which may mean that important measurement and marketing programs might be significantly delayed.

Collection configuration management systems can be used to improve the management of monitoring objects. In one embodiment, a collection configuration management system can deploy a single monitoring object or a monitoring object container to a content site. Each page or any subset of web pages in the content site can incorporate the monitoring object container as a universal monitoring object that can be used to gather any type of visitor data of a visitor to a content site. This monitoring object container can be used to interface with any number of third party vendor monitoring objects without requiring, in certain embodiments, such monitoring objects to be coded expressly in the code of the web pages of the content site. Thus, changes to the monitoring of a content site may be made through a user interface provided by the collection configuration management system without having to use a developer to add the monitoring objects to the web pages manually. As a result, the collection configuration management system can be more accessible to people without IT or programming knowledge.

This monitoring object container approach to monitoring object management can promote high scalability and provide marketing agility, enabling marketers and other collection management users to rapidly change data collected or analyzed by the monitoring object management system. Further, because one monitoring object container is embedded within the web pages in certain embodiments, the web pages may load faster and, therefore, include many performance improvements. Moreover, there may be reduction of IT costs provided by using the disclosed collection configuration management system because IT personnel can shift away from performing monitoring object management work to focusing on other IT work.

II. Distributed Monitoring Object Management

Content pages (such as web pages) may include one or more content objects (such as images or videos) from one or more providers other than the provider of the content pages. For instance, an image created or generated by one provider can be included in a content page before end user delivery of the content page, which may be created or operated by another provider. The use and delivery of the content object in this matter may be desirable, for instance, in situations where instructions may not be fixed in the content page without modifying the content page (sometimes referred to as hardcoded) or the content object may be provided in an unknown delivery environment or data accessibility environment (such as in mobile devices, non-script or iframe delivered via a display server, or intra video advertisements).

The content object can serve to supplement other information of the content page like core content page content from the creator or operator of the content page. The content object can enable customized information, such as messages or graphics, to be dynamically displayed as part of the content page. One example of such a content object can be an advertisement from an organization to be included in a content page.

A content object can further include one or more monitoring objects (for example, tags) or a monitoring object container that may be part of the content object and used to track user interactions with the content object or other parts of a content page in which the content object is incorporated. Including the one or more monitoring objects or monitoring object container in the content object can be problematic, however, because adding, managing, or modifying the one or more monitoring objects or monitoring object container in the content object can be difficult. For example, two or more monitoring objects included in a content object can be from different monitoring object providers. This may, in turn, cause frustration between the different monitoring object providers and the provider of the content object because the different monitoring object providers may desire to frequently modify their monitoring objects or at different times. In addition, the different monitoring object providers can unknowingly cause end user systems executing the monitoring objects to perform conflicting or redundant operations, which undesirably slow performance of the end user systems.

This disclosure describes, in some embodiments, collection configuration management systems that can manage one or more monitoring objects included in one or more content objects. The collection configuration management systems can compartmentalize monitoring object configurations into monitoring object bundle (sometimes referred to as a distributed bundle) that may be processed or executed as a result of loading the one or more content objects. The monitoring object bundle can be generated to include one or more monitoring objects, as well as monitoring object management loader functionality like the ability to wrap one or more parts of the one or more content objects in order to track user interactions with the one or more content objects. By bundling the one or more monitoring objects with the monitoring object management loader functionality, security and governance can be improved because processing and sourcing of user interaction data can occur at the end user system rather than an external server, and latency at the end user system can be reduced because the monitoring object bundle may be generated to diminish or remove the use of monitoring object load rules or enable operations performed by different monitoring objects to be harmonized or for redundant operations to be minimized or removed from the monitoring objects before inclusion in the monitoring object bundle.

The collection configuration management systems can further enable a collection management user to efficiently manage which monitoring objects are included in a monitoring object bundle and which one or more content objects are associated with the monitoring object bundle. The collection configuration management systems can import content organization data from a content object server and thereby determine what content objects or grouping of content objects that the monitoring object bundle may be included as part of and what unique identifiers may be associated with the content objects or grouping. Subsequently, based at least on one or more user selections, the collection configuration management systems can determine a unique identifier associated with a selected content object or grouping of content objects and associate the unique identifier with the monitoring object bundle. The collection configuration management systems can use the unique identifier to cause the monitoring object bundle to be provided to end user systems when the end user systems load one of the selected content object or grouping. Such a configuration can provide flexibility for the collection management user to easily and remotely change the monitoring object bundle without changing the selected content object or grouping, such as the instructions included in the selected content object or grouping for requesting or processing the monitoring object bundle.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

III. Monitoring Object Management Systems and Methods

FIG. 1 illustrates a computing environment 100 for implementing various monitoring object features, including some or all of the monitoring object management features described herein. In the computing environment 100, an end user system 102 communicates over a network 108 with a site server 110. The end user system 102 can include any form of computing device and may be a desktop, laptop, smartphone, tablet, or the like. A browser 103 or other application software installed in the end user system 102 accesses one or more content pages of a content site stored in content pages storage 112 of the site server 110. The content pages can be files that may be accessed remotely and provided to the end user system 102. Accordingly, the content pages may be web pages, documents (such as pdf documents), videos, images, text, combinations of the same, or the like. The site server 110 may be a web server, an application server, a database server, combinations of the same, or the like. Further, the network 108 can include a local area network (LAN), a wide area network (WAN), a company intranet, the public Internet, combinations of the same, or the like.

A content page of the content site can incorporate one or more content objects provided by a content object server 140. The content object server 140 can store content objects in a content objects storage 142. As some examples, the content object server 140 can be a publication server or an advertising server. The content object server 140 can transmit the content objects to the site server 110 or the end user system 102 in response to a request for a content object or may push the content objects to the site server 110 or the end user system 102. The content objects can be web pages, documents, videos, images, text, combinations of the same, or the like. The content objects can be supplemental content from a provider other than a content site provider that provides base content for the content site. In some embodiments, one or more of the content objects can be included in a content page by the site server 110 before or when the site server 110 provides the content page to the end user system 102. In other embodiments, the browser 103 can request and obtain one or more content objects from the content object server 140 upon loading of a content page that incorporates the one or more content objects.

A content object can include instructions for requesting a monitoring object bundle. The instructions for requesting the monitoring object bundle can include a source location address (for example, a web address) for the monitoring object bundle or other information to enable and cause the browser 103 to request or obtain the monitoring object bundle from another device, such as from a configuration data storage 122 of a collection control server 120 via the network 108. The monitoring object bundle can be a data collection monitoring object bundle that upon receipt by the browser 103 is executed and causes the browser 103 to supply user interaction, visitor identification, or other data to an analytics system 130 or collection vendor systems 150 (optionally through the collection control server 120). The monitoring object bundle, moreover, may be at least partly customized for the content object that includes instructions for requesting the monitoring object bundle. The monitoring object bundle can itself include one or more monitoring objects. In one example, the monitoring object bundle can include one or more monitoring objects and monitoring object management loader functionality. The monitoring object management loader functionality can provide the ability, for instance, to wrap a content object in order to trigger tracking upon a user interaction, such as a user selection via a mouse click, with the content object. The monitoring object bundle or monitoring object can be a data file including JavaScript™, HyperText Markup Language (HTML), JavaScript™ Object Notation (JSON), Hypertext Preprocessor (PHP), Node.js, Python, combinations of the same, or the like, in one embodiment. In other embodiments, the monitoring object bundle or monitoring object can be coded in another programming language suitable for execution by the end user system 102. Moreover, the monitoring object bundle or monitoring object may be standalone code or component code, where component code contrasts with standalone code in that component code unlike standalone code may not be executed without complementary component code.

Additionally or alternatively, a content object can include a monitoring object container or multiple monitoring objects, or one or more content pages of the content site can include a monitoring object container or one or more monitoring objects. Monitoring objects and monitoring object containers, such as tags and tag containers, are described in detail in U.S. Pat. No. 8,805,946, titled "SYSTEM AND METHOD FOR COMBINING CONTENT SITE VISITOR PROFILES," which is incorporated by reference herein in its entirety.

The analytics system 130 can include a visitor processing system 132 and a collection configuration management system 134, as well as a visitor profiles storage 136. The visitor processing and collection configuration management systems 132, 134 are shown separately for illustrative purposes, although their functionality may be implemented by a single system. The analytics system 130 can also be implemented without the collection configuration management system 134, and thus, the functionality of the visitor processing system 132 can be implemented independent of any collection configuration management functionality. Further, the analytics system 130 can be implemented without the visitor processing system 132, and thus, the functionality of the collection configuration management system 134 can be implemented independent of any visitor processing functionality.

The visitor processing system 132 can enable collection management users to configure the types of data tracked for different visitors of a content site, as well as to analyze and report on this visitor data. For instance, the visitor processing system 132 can provide one or more user interfaces that enable customization of collecting information about visitors to a content site. This information can be obtained initially from a monitoring object bundle or one or more monitoring objects, which may be provided through the collection control server 120 to the end user system 102 for execution in the browser 103. Upon execution in the browser 103, the monitoring object bundle or one or more monitoring objects can supply visitor data to the visitor processing system 132 (optionally through the collection control server 120). Such visitor data can be stored in visitor profiles in the visitor profiles storage 136. Collection management users can, for example, subsequently query the visitor profiles to obtain reports or other information about visitors to a content site.

The collection configuration management system 134 can be used to manage the one or more monitoring objects associated with the content pages stored in the content pages storage 112 or the content objects stored in the content objects storage 142. For instance, the collection configuration management system 134 can provide functionality for collection management users to select which monitoring objects to associate with which one or more content pages or one or more content objects for a variety of vendor-specific processing purposes or customize the monitoring objects for particular content pages or content objects. These purposes can include obtaining analytics for data analysis or business intelligence, tracking affiliate activity with respect to a content site, obtaining user data for displaying targeted ads, obtaining user data for customizing search functionality or email campaigns targeted to the end users, obtaining user data for personalizing content of a content page, obtaining user data for integration with social networking functionality, obtaining user data for big data analysis, combinations of the same, or the like. Data collected by the monitoring object bundle or monitoring objects can be provided to the collection vendor systems 150, which can perform any of this vendor-specific processing. The data collected or related data may additionally or alternatively be passed to the collection vendor systems 150 through the site server 110, the collection control server 120, or the analytics system 130. In some embodiments, the collection configuration management system 134 can include a publish engine that generates or revises monitoring objects bundles, monitoring objects, or monitoring object containers.

A collection management user system 104 can access the collection control server 120 or the analytics system 130 via the network 108. Like the end user system 102, the collection management user system 104 can include a browser 105 or other application software that can access network applications over the network 108. The collection management user system 104 can also be any type of computing device including, but not limited to, a desktop, laptop, tablet, smartphone, or the like. The collection management user system 104 can be operated by collection management users such as marketing professionals, website operators, business users, operators of a content site or the site server 110, or any other individual who uses monitoring object bundles or monitoring objects or data obtained therefrom. Collection management users are not the end users of a content site in certain embodiments. The collection management users can use the collection management user system 104 to dynamically update the types of data tracked or analyzed for different visitors of a content site. In addition, the collection management user can use the collection management user system 104 to customize monitoring object bundles or monitoring objects for particular content pages or content objects.

The computing environment 100 can additionally include more end user systems and collection management user systems than just the end user system 102 and the collection management user system 104 shown in FIG. 1. Multiple end user systems can thus, for instance, access content pages from the site server 110 via the network 108, and multiple collection management user systems can interact with the analytics system 130 via the network 108.

Figure 2:
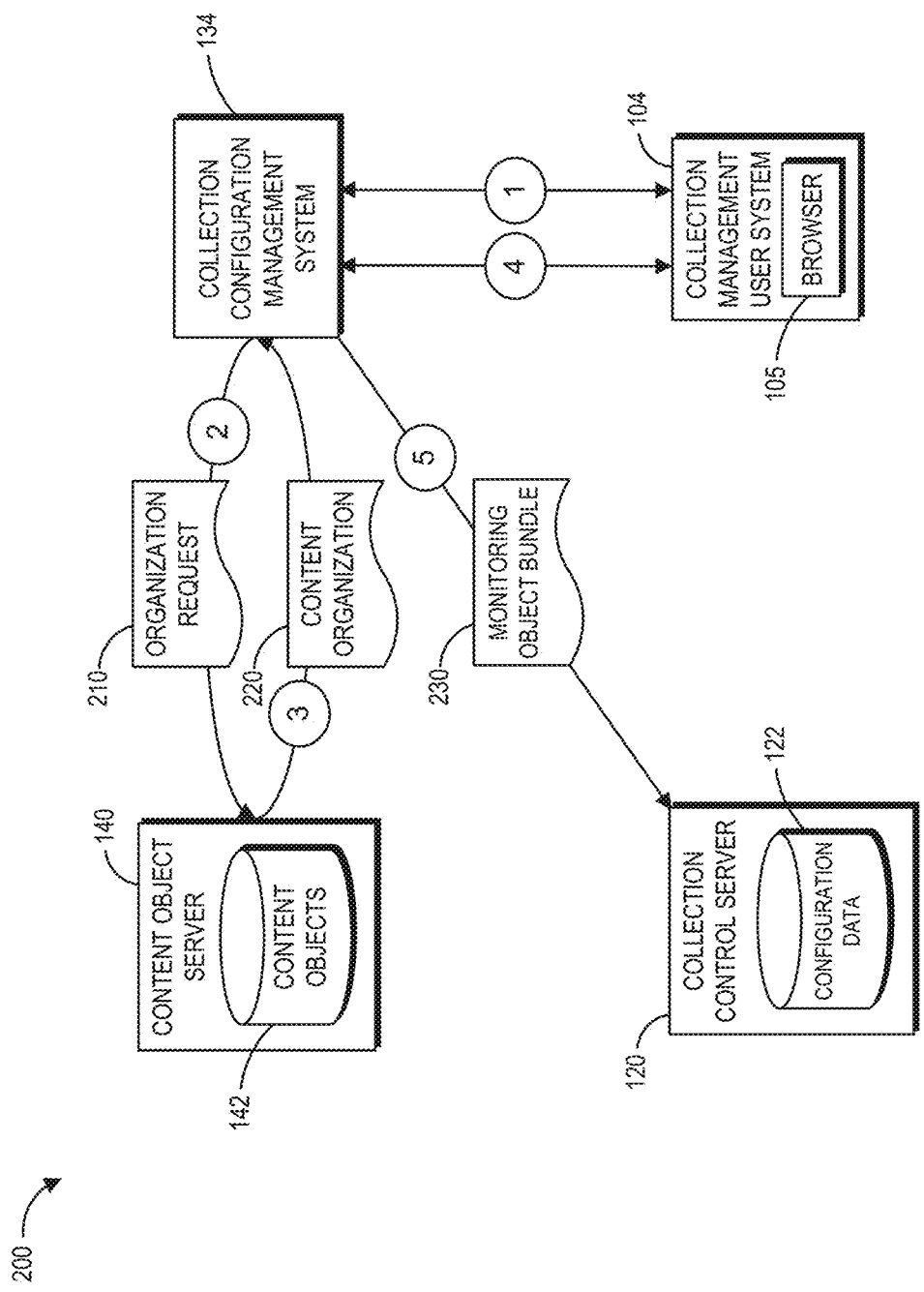
FIG. 2 depicts example communication within the computing environment of FIG. 1.

Turning to FIG. 2, a computing environment 200 is shown that illustrates example communication within the computing environment 100 of FIG. 1.

The computer environment 200 includes the content object server 140 with the content objects storage 142. The content objects storage 142 can store content objects, which can be organized into a hierarchy such as a tree structure or parent-child relationship. The content objects can, for instance, be organized into groups where each of the content objects can be included in one or more of the groups. For example, one of the groups can include two of the content objects, another of the groups can include three or more of the content objects, and yet another of the groups can include one of the content objects. The groups can further be organized into one or more additional groups, which can be organized into one or more other higher level groups, which can be organized into yet one or more even higher level groups, and so forth. Each group of a higher level can include one or more content objects or groups from a lower level. Each of the content objects and each group at each grouping level can be associated with an identifier (sometimes referred to as a content identifier) indicative of the one corresponding content object or group. Each identifier associated with each of the content objects and each group at each grouping level can be considered unique because the identifier can be different from the other identifiers indicative of the other content objects and groups.

The content object server 140 can receive, generate, or revise content organization data 220 that may include the identifiers uniquely associated with the content objects and groups (for instance, identifiers can be associated with branches of a tree structure of the content organization data 220). The content organization data 220 can further include an indication of the groupings of the content objects. In one example, the content object server 140 can generate the content organization data 220 in response to receiving user inputs indicating desired groupings of the content objects and revise the content organization data 220 over time in response to receiving additional user inputs indicating revised desired groupings. As another example, the content object server 140 can import the content organization data 220 from another device and revise the content organization data 220 over time in response to receiving user inputs requesting to revise groupings.

In one implementation, the content objects can be organized into a type of grouping structure used to organize online digital marketing campaigns. For example, the content objects can correspond to creatives, such as images or videos to be incorporated in a content page. The creatives can, in turn, be organized into one or more campaigns. The one or more campaigns can be organized into one or more line items. The one or more line items can be organized into one or more insertion orders. In addition, the creatives, one or more campaigns, one or more line items, or one or more insertion orders can be organized into one or more other groups. Each of the creatives, one or more campaigns, one or more line items, one or more insertion orders, and one or more other groups can be associated with an identifier uniquely indicative of the one corresponding creative, campaign, line item, insertion order, or other group.

At communication exchange 1 of FIG. 2, the collection management user system 104 and the collection configuration management system 134 can communicate via the network 108 to enable a collection management user to configure the collection configuration management system 134 to request and access the content organization data 220 from the content object server 140. The collection management user can input via the browser 105 authentication data, such as a key or credential, for accessing the content organization data 220 so that the authentication data can be provided by the browser 105 to the collection configuration management system 134.

Figure 3:
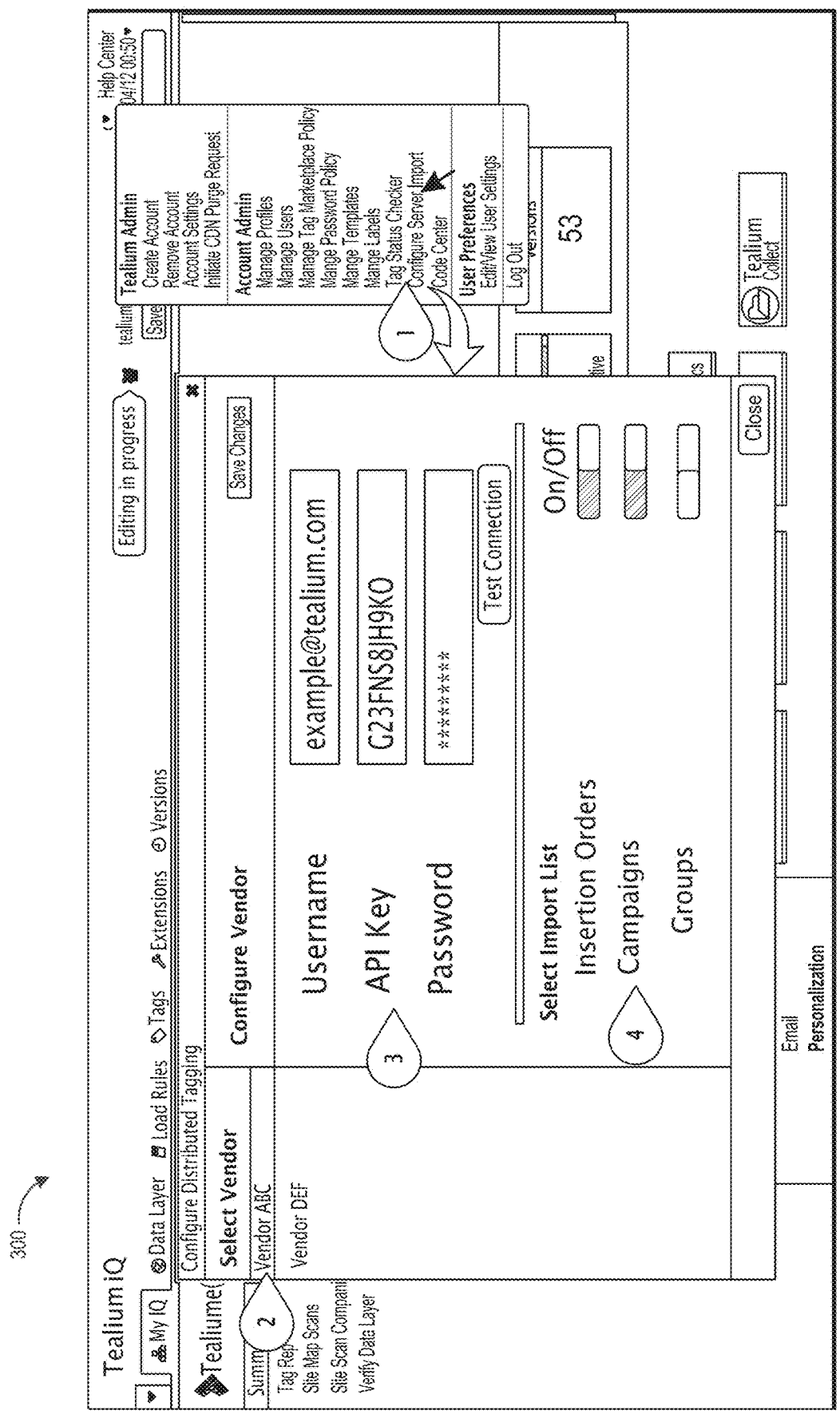
FIG. 3 depicts an example data import user interface.

In one example, a user interface 300 shown in FIG. 3 can be used to configure the collection configuration management system 134 to request and access the content organization data 220 from the content object server 140. At denotation 1 of the user interface 300, the collection management user can select to "Configure Server Import," which may cause the cause the "Configure Distributed Tagging" interface to appear. At denotation 2 of the user interface 300, the collection management user can select a content server vendor, such as the content object server 140 or another content server vendor not shown in FIG. 1, from which to request and access the content organization data 220. At denotation 3 of the user interface 300, the collection management user can input the authentication data (such as a username, application programming interface (API) key, or password), as well as test a connection to the content server vendor. At denotation 4 of the user interface 300, the collection management user can select one or more object tree levels (such as, insertion orders, campaigns, or groups) of the content organization data 220 to request to import from the content server vendor.

At communication transmission 2 of FIG. 2, the collection configuration management system 134 can transmit an organization request 210 to the content object server 140 via the network 108. The organization request 210 can include the authentication data for accessing the content organization data 220 from the content object server 140, as well as an indication of one or more portions of the content organization data 220 requested by the collection configuration management system 134. For instance, the indication of one or more portions of the content organization data 220 can denote which of one or more object tree levels of the content organization data 220 are being requested. In one implementation, the organization request 210 can be an API request.

At communication transmission 3 of FIG. 2, the content object server 140 can provide the content organization data 220 (or at least the requested one or more portions of the content organization data 220) to the collection configuration management system 134 via the network 108. The collection configuration management system 134 can, for instance, use the content organization data 220 to (i) determine the content objects that are stored on the content objects storage 142, (ii) the unique identifiers associated with the content objects and various groups, and (iii) the indication of the groupings of the content objects. In one implementation, the content organization data 220 can be an API response.

In one example, the content organization data 220 can be organized into the following aggregated data structure:

Insertion Order 1 (Identifier=IO_1)
    Line Item 1 (Identifier=LI_1)
        Campaign 1 (Identifier=C_1)
        Campaign 2 (Identifier=C_2)
        Campaign 3 (Identifier=C_3)
    Line Item 2 (Identifier=LI_2)
        Campaign 4 (Identifier=C_4)
        Campaign 5 (Identifier=C_5)
Insertion Order 2 (Identifier=IO_2)
    Line Item 3 (Identifier=LI_3)
        Campaign 6 (Identifier=C_6)
        Campaign 7 (Identifier=C_7)
    Line Item 4 (Identifier=LI_4)
        Campaign 8 (Identifier=C_8)

As can be understood from reviewing this aggregated data structure, Campaign 1 can be associated with the Identifier C_1, as well as (i) the Identifier LI_1 via Campaign 1's grouping as part of Line Item 1 and (ii) the Identifier IO_1 via Campaign 1's grouping as part of Insertion Order 1. Additionally, Campaign 2 can be associated with the Identifier C_2, as well as (i) the Identifier LI_1 via Campaign 2's grouping as part of Line Item 1 and (ii) the Identifier IO_1 via Campaign 2's grouping as part of Insertion Order 1. Notably, the Identifier C_1 can uniquely identify Campaign 1 but not any of Campaigns 2-8. Similarly, the Identifier LI_1 can uniquely identify a group that includes Campaigns 1-3 but not any of Campaigns 4-8, and the Identifier IO_1 can uniquely identify Line Items 1-2 and Campaigns 1-5 but not any of Line Items 3-4 or Campaigns 6-8.

Each node of the aggregated data structure of the preceding paragraph can further be assigned a unique access identifier separate from the unique campaign-related identifiers like IO_#, LI_#, and C_#. The unique access identifier for each node can be automatically assigned by the collection configuration management system 134 and may, for instance, be generated by hashing one or more identifiers related to the node, such as an insertion order, line item, or campaign identifier (for example, Hash[Insertion Order+ Line Item+Campaign]=access identifier, where Hash can be performed using a public key in some instances). The unique access identifier can desirably, in certain embodiments, facilitate easier, faster, or more secure access to a monitoring object bundle that is associated with a content object assigned the unique access identifier than if a unique campaign-related identifier associated with the content object were used for access purposes. Moreover, the unique access identifiers can enable a decoupling of the identifiers used for organizing the aggregated data structure, such as IO_#, LI_#, and C_#, from the identifiers used for accessing monitoring object bundles. As some examples, the node assigned the Identifier IO_1 can also be assigned an access identifier like AA000, the node assigned the Identifier IO_2 can also be assigned an access identifier like AA100, the node assigned the Identifier LI_1 can also be assigned an access identifier like BB000, the node assigned the Identifier LI_2 can also be assigned an access identifier like BB100, the node assigned the Identifier C_1 can also be assigned the access identifier CC000, and the node assigned the Identifier C_2 can also be assigned the access identifier CC100.

At communication exchange 4 of FIG. 2, the collection management user system 104 and the collection configuration management system 134 can communicate via the network 108 to enable the collection management user to associate a monitoring object bundle 230 with the content organization data 220 and generate the monitoring object bundle 230. For example, the collection management user can provide a user input via the browser 105 denoting a content object or group of content objects or denoting a unique identifier associated with a content object or group of content objects from the content organization data 220. From the user input, the collection configuration management system 134 can identify a selection event indicative of the unique identifier (for instance, a unique access identifier or a unique campaign-related identifier) to be associated with the monitoring object bundle 230, and the collection configuration management system 134 can generate monitoring object data for generating the monitoring object bundle 230 and generate the monitoring object bundle 230.

At communication transmission 5 of FIG. 2, the collection configuration management system 134 can provide the monitoring object bundle 230 along with an indication of the unique identifier associated with the monitoring object bundle 230 to the collection control server 120. In one example, the collection configuration management system 134 can name the monitoring object bundle 230 so that its name includes the unique identifier (for instance, "LI_2.js" can be the name assigned to a monitoring object bundle associated with Line Item 2 discussed with respect to communication transmission 3 of FIG. 2). In another example, the collection configuration management system 134 can include the unique identifier as a value incorporated in the monitoring object bundle 230. The collection control server 120 can store the monitoring object bundle 230 in the configuration data storage 122. The collection control server 120 can, for instance, store the monitoring object bundle 230 so that the monitoring object bundle 230 is accessible from the configuration data storage 122 using the unique identifier associated with the monitoring object bundle 230.

Figure 4:
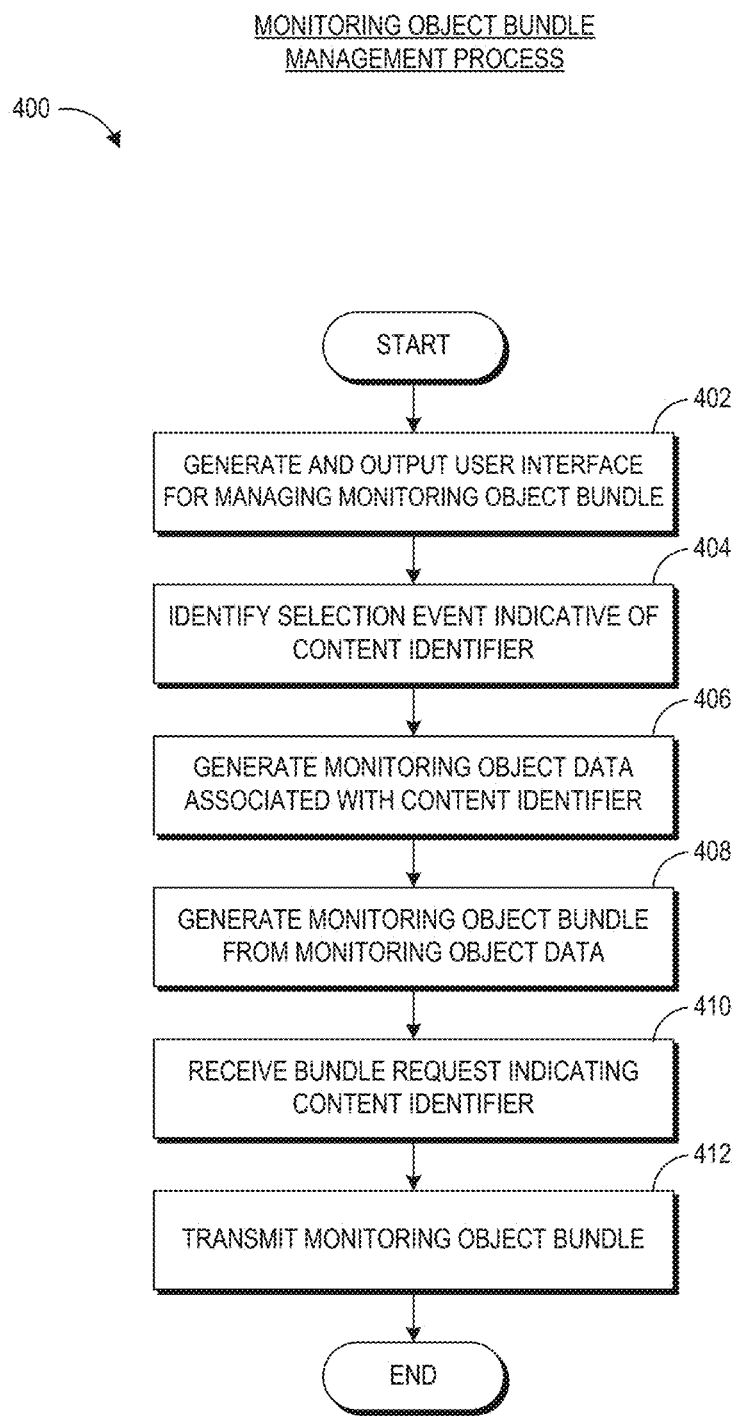
FIG. 4 depicts an example monitoring object bundle management process.

Turning to FIG. 4, a monitoring object bundle management process 400 is shown. The process 400 illustrates an example mode of operation of the computing environment 100 and may be implemented by the various components shown in the computing environment 100. For convenience, the process 400 is described in the context of the computing environments 100 and 200, but may instead be implemented by other systems described herein or other computing systems not shown. The process 400 provides one example approach by which a monitoring object bundle can be generated, associated with an identifier indicative of a content object or grouping of content objects, and provided to an end user system. Advantageously, in certain embodiments, the process 400 can enable a collection management user to select the content object or grouping of content objects to be associated with the monitoring object bundle and cause the monitoring object bundle to be provided to a browser of the end user system when the selected content object or one of the selected grouping may be loaded by the browser of the end user system.

At block 402, the collection configuration management system 134 can generate and output a user interface to manage a monitoring object bundle. The collection configuration management system 134 can, for example, generate the user interface and output the user interface via the network 108 for presentation on the browser 105 of the collection management user system 104. The collection configuration management system 134 can generate the user interface to depict a representation of at least some of the content organization data 220, such as by listing one or more content objects and one or more indications of the groupings of content objects provided by the content organization data 220.

Figure 5A:
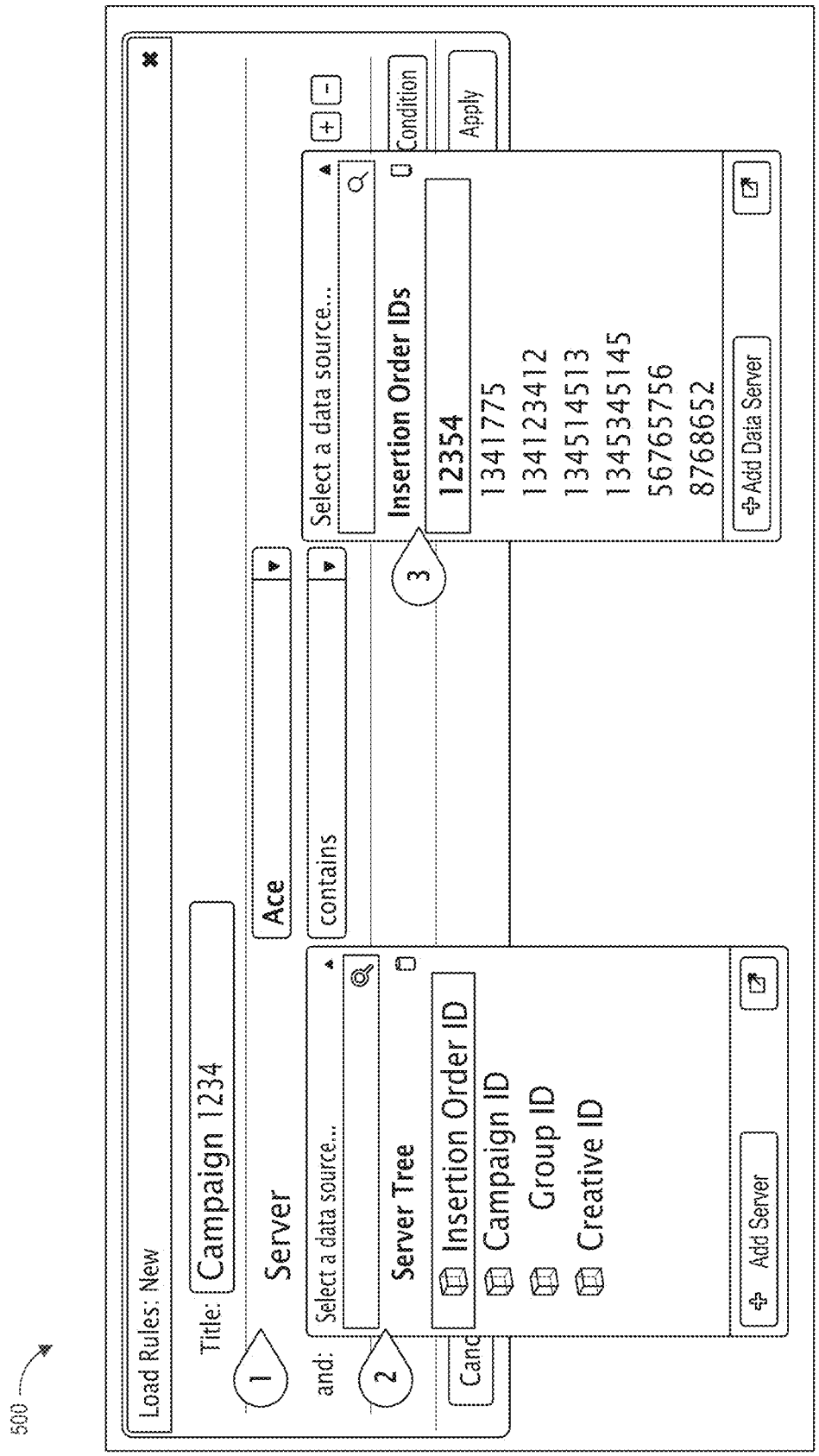

In one example, the user interface can include a user interface 500 shown in FIG. 5A. The user interface 500 can enable the collection management user to create a load rule for incorporating monitoring objects like tags into the monitoring object bundle. As illustrated, the user interface 500 can provide at denotation 1 of the user interface 500 a drop-down from which the collection management user can select a content server vendor, such as the content object server 140, for which to access the content organization data 220. The collection management user can further select at denotation 2 of the user interface 500 what type of grouping of the content objects (for example, Insertion Order ID, Campaign ID, Group ID, or Creative ID) of the content organization data 220 to associate. The collection management user can further select at denotation 3 of the user interface 500 what specific content object or grouping of the content objects (for example, based on an assigned identifier) of the content organization data 220 to associate. Additionally, the user interface can further include a user interface 550 shown in FIG. 5B. As illustrated, the user interface 550 can enable the collection management user to select what tags to include as part of the monitoring object bundle. The collection management user can, for example, make this selection at denotation 4 of the user interface 550 by selecting a checkbox next to the load rule created with the user interface 500 to apply the load rule to a particular tag. A similar selection may be made for other tags to incorporate the other tags into the monitoring object bundle.

Figure 6A:
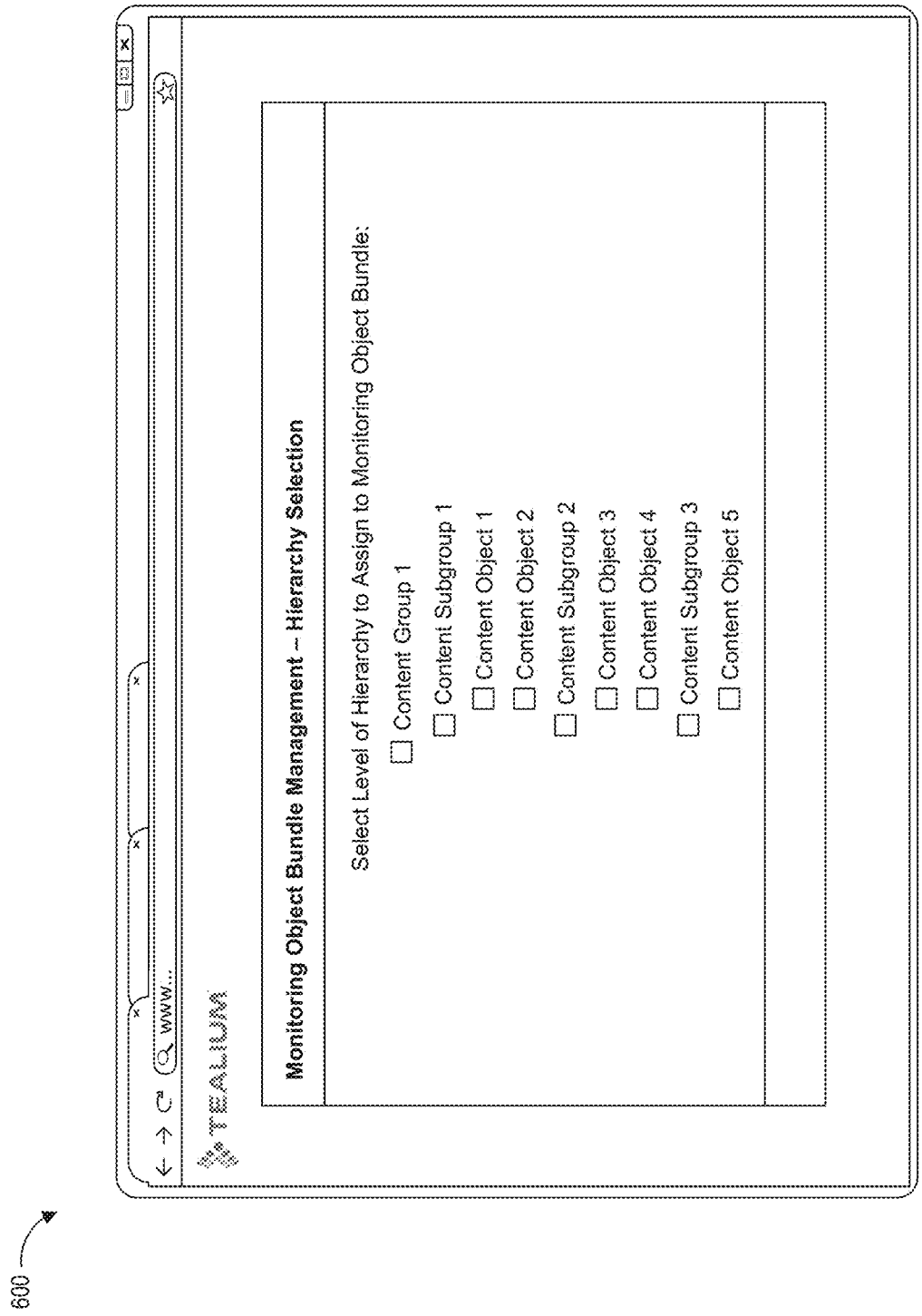

In another example, the user interface can include a user interface 600 shown in FIG. 6A. As illustrated, the user interface 600 can list five content objects that are grouped into three subgroups, which are further grouped into one group (for example, Content Objects 1 and 2 can be part of Content Subgroup 1 and Content Group 1; Content Objects 3 and 4 can be part of Content Subgroup 4 and Content Group 1; and Content Object 5 can be part of Content Subgroup 3 and Content Group 1). The five content objects can, for instance, be five different images or videos that can be incorporated into one or more content pages. The collection configuration management system 134 can receive a user input via the user interface 600, and the user input can denote one of the Content Group 1, Content Subgroup 1, Content Subgroup 2, Content Subgroup 3, Content Object 1, Content Object 2, Content Object 3, Content Object 4, or Content Object 5. The collection management user may have provided an input by selecting one of the checkboxes next to the listed content objects, subgroups, and groups to provide the user input to the collection configuration management system 134 (for instance, the collection management user may select the checkbox next to Content Subgroup 2, and the collection configuration management system 134 can receive a user input denoting the Content Subgroup 2).

Figure 6B:
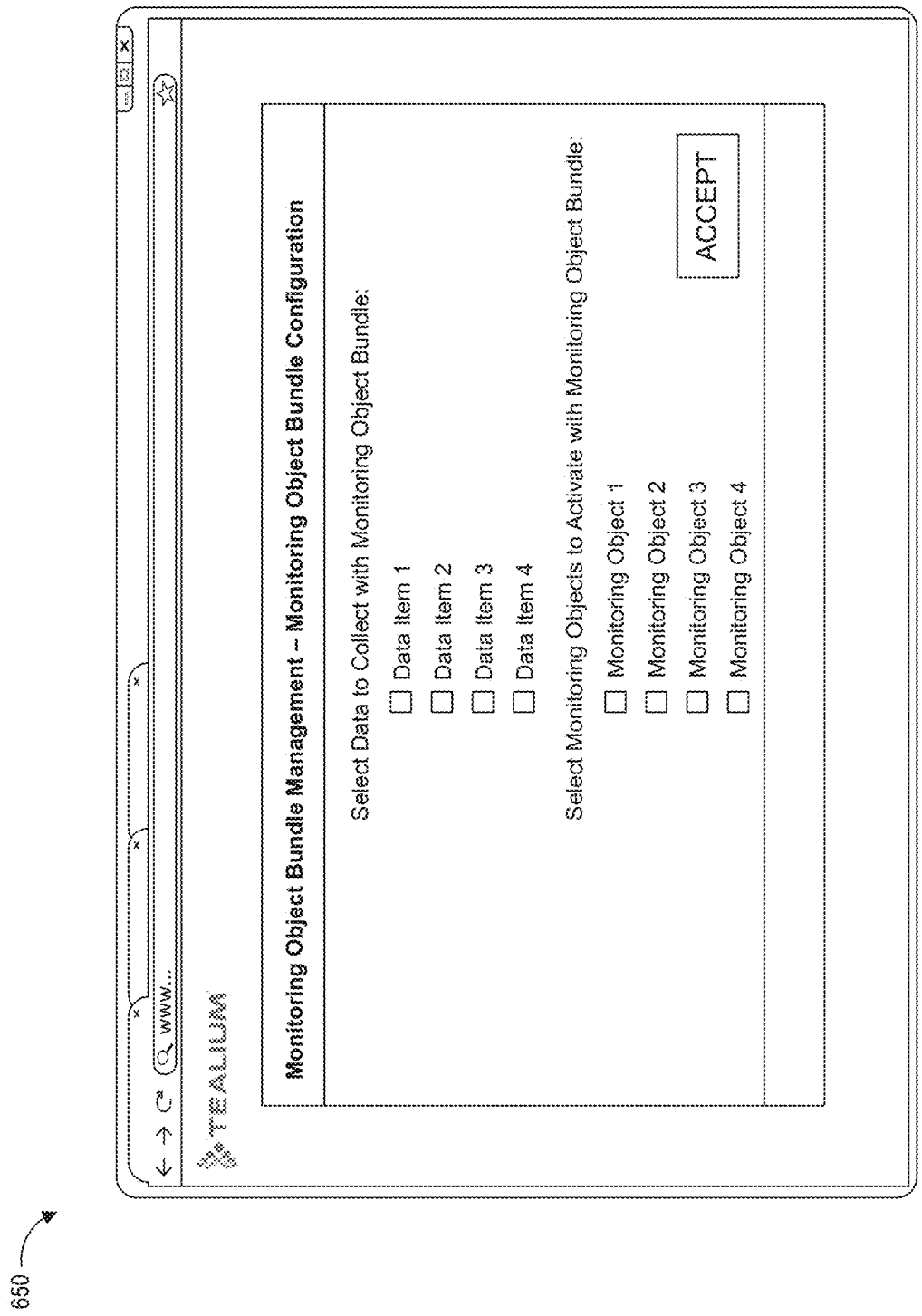

Additionally or alternatively, the user interface can depict a representation of one or more configuration settings for the monitoring object bundle. The user interface can, for instance, enable the collection management user to select or revise (i) what one or more data items are collected upon execution of the monitoring object bundle by the end user system 102 and (ii) what monitoring objects are activated upon execution of the monitoring object bundle by the end user system 102. The user interface can, for instance, include a user interface 650 shown in FIG. 6B. As illustrated, the user interface 650 can list (i) four data items—Data Item 1, Data Item 2, Data Item 3, and Data Item 4—that can be selected or not selected to be collected upon execution of the monitoring object bundle by the end user system 102 and (ii) four monitoring objects—Monitoring Object 1, Monitoring Object 2, Monitoring Object 3, and Monitoring Object 4—that can be selected or not selected to be included in the monitoring object bundle and activated upon execution of the monitoring object bundle by the end user system 102. The four data items can, for instance, include items such as whether to track an end user selection of a content object or to track an end user entry of data to a content object or content page. The four monitoring objects can, for instance, each be a different monitoring object for a different vendor or a different monitoring object that causes the end user system 102 to transmit interaction data to a different computing device. The collection configuration management system 134 can receive a user input via the user interface 650, and the user input can denote one or more of the Data Items 1-4 and one or more of the Monitoring Objects 1-4. The collection management user may have provided an input to the user interface 650 by selecting one or more of the checkboxes next to the listed data items and monitoring objects (for example, the checkboxes next to Data Items 1 and 2 and Monitoring Objects 1 and 2) and then selecting ACCEPT to confirm the one or more selections.

At block 404, the collection configuration management system 134 can identify a selection event indicative of a content identifier. The content identifier can be an identifier from the content organization data 220 that may be looked-up or calculated using the content organization data 220 and is designated to be associated with the monitoring object bundle. The content identifier can be similar to or the same as one of the unique campaign-related identifiers or unique access identifiers described herein, and the content identifier can be a number or a string of characters in some cases. The collection configuration management system 134 can in some instances identify the selection event based at least on a user input received via a user interface, such as one of the user interfaces 500, 550, 600, and 650. The user input can, for instance, denote one or more of (i) the content identifier, (ii) the one or more content objects associated with the content identifier, or (iii) the group of the one or more content objects associated with the content identifier.

In one example, the collection configuration management system 134 can identify the selection event as the selection at denotation 4 in the user interface 550 of the checkbox next to the load rule created with the user interface 500 to apply the load rule. In another example, the collection configuration management system 134 can identify the selection event as the selection via the user interface 600 of one of the checkboxes next to the listed content objects, subgroups, and groups.

The collection configuration management system 134 can additionally or alternatively identify the selection event based at least on one or more automatic selection rules, such as (i) a default selection rule to create an initial selection for the collection management user or (ii) a comparable selection rule to perform automatic selections when two or more content objects may be determined to be sufficiently similar (for example, containing at least some of the same text or images).

At block 406, the collection configuration management system 134 can generate monitoring object data associated with the content identifier. The monitoring object data can include data sufficient to generate the monitoring object bundle and can be instructions like settings usable to construct the monitoring object bundle. The collection configuration management system 134 can generate the monitoring object data by creating new monitoring object data or revising existing monitoring object data. The collection configuration management system 134 can generate the monitoring object data in response to the identifying the selection event. The monitoring object data can be configured at least partly by the collection management user via the browser 105, for instance, so that the monitoring object bundle may include one or more particular monitoring objects or collect certain data like Document Object Model (DOM) elements of a content page, Meta Data, combinations of the same, and the like.

At block 408, the collection configuration management system 134 can generate the monitoring object bundle from the monitoring object data. The collection configuration management system 134 can generate the monitoring object bundle to include one or more monitoring objects that upon receipt by the browser 103 is executed and causes the browser 103 to gather and supply user interaction, visitor identification, or other data (for instance, user interaction data from the end user of the end user system 102 interacting with one of the content objects associated with the content identifier) to the analytics system 130 or one or more of the collection vendor systems 150. In one example, the monitoring object bundle can include one or more monitoring objects, as well as monitoring object management loader functionality. The monitoring object management loader functionality can provide the ability, for instance, to wrap a content object in order to trigger tracking upon a user interaction with the content object. The collection configuration management system 134 can generate the monitoring object bundle using a publish engine, in some instances.

In one implementation, the collection configuration management system 134 can generate the monitoring object data in response to the identifying the selection event, and the monitoring object bundle can then be stored in the configuration data storage 122 for later access and transmission. In another implementation, the collection configuration management system 134 can generate the monitoring object data in response to the receiving the bundle request indicating the content identifier at block 410, and the collection configuration management system 134 may thus be considered to generate the monitoring object bundle on demand or on-the-fly.

The monitoring object bundle can, for example, include multiple monitoring objects that when executed by the end user system 102 cause the end user system 102 to load the multiple monitoring objects without first determining whether one or more monitoring object load conditions at the end user system 102 has been satisfied. This can be because the monitoring object bundle may be constructed so that the one or more monitoring object load conditions are accounted for and implemented in the monitoring object bundle as generated and thus determining whether the one or more monitoring object load conditions has been satisfied may not be useful. The monitoring object bundle can accordingly, in certain embodiments, be desirable for use in situations where the end user system 102 may not be able to process monitoring object load conditions.

Moreover, the monitoring object bundle can be generated so that execution of the monitoring object bundle by the end user system 102 does not cause the end user system 102 to request or download one or more monitoring objects. In one implementation, the collection configuration management system 134 can generate the monitoring object bundle to include multiple monitoring objects, but revise one or more of the multiple monitoring objects before incorporation into the monitoring object bundle. For instance, the collection configuration management system 134 can revise one or more of the multiple monitoring objects so that redundant data collection functions may be not be included in the monitoring object bundle and each data collection function is thus performed just once by the end user system 102. As a result, execution of the monitoring object bundle by the end user system 102 may not cause the end user system 102 to perform the same data collection function (such as a query string parser function or user interaction detection function) twice or more while gathering interaction data. In addition, instruction conflicts between the multiple monitoring objects can be reduced or eliminated in the monitoring object bundle so that processor performance of the end user system 102 may be enhanced.

At block 410, the collection control server 120 or the collection configuration management system 134 can receive a bundle request that indicates the content identifier. The bundle request may have been received from the end user system 102 via the network 108. The end user system 102 may have transmitted the bundle request in response to loading a content page that includes one of the one or more content objects associated with the content identifier.

In one example, the bundle request can be a download query to download the monitoring object bundle from a source location address (such as a web address like "tags-.tiqcdn.com/utag/tealium/main/download/[insert_identifier].js" assigned to a memory location in the configuration data storage 122 or the analytics system 130 where [insert_identifer] can be a placeholder for a campaign-related identifier like "LI_1" that may correspond to Line Item 1 or an access identifier as discussed herein) at which the monitoring object bundle is stored. The content identifier from the request can, in some embodiments, be used to access from storage the monitoring object bundle that has the matching content identifier.

At block 412, the collection control server 120 or the collection configuration management system 134 can transmit the monitoring object bundle, such as via the network 108 to the end user system 102. The monitoring object bundle can be transmitted in response to receiving the bundle request at block 410. The monitoring object bundle, upon receipt by the end user system 102, can be executed by the browser 103 and cause the browser 103 to gather and supply user interaction data to the analytics system 130 or one or more of the collection vendor systems 150. The user interaction data can be indicative of user interactions with the content page including the one of the one or more content objects associated with the content identifier that resulted in the end user system 102 transmitting the request.

Figure 7:
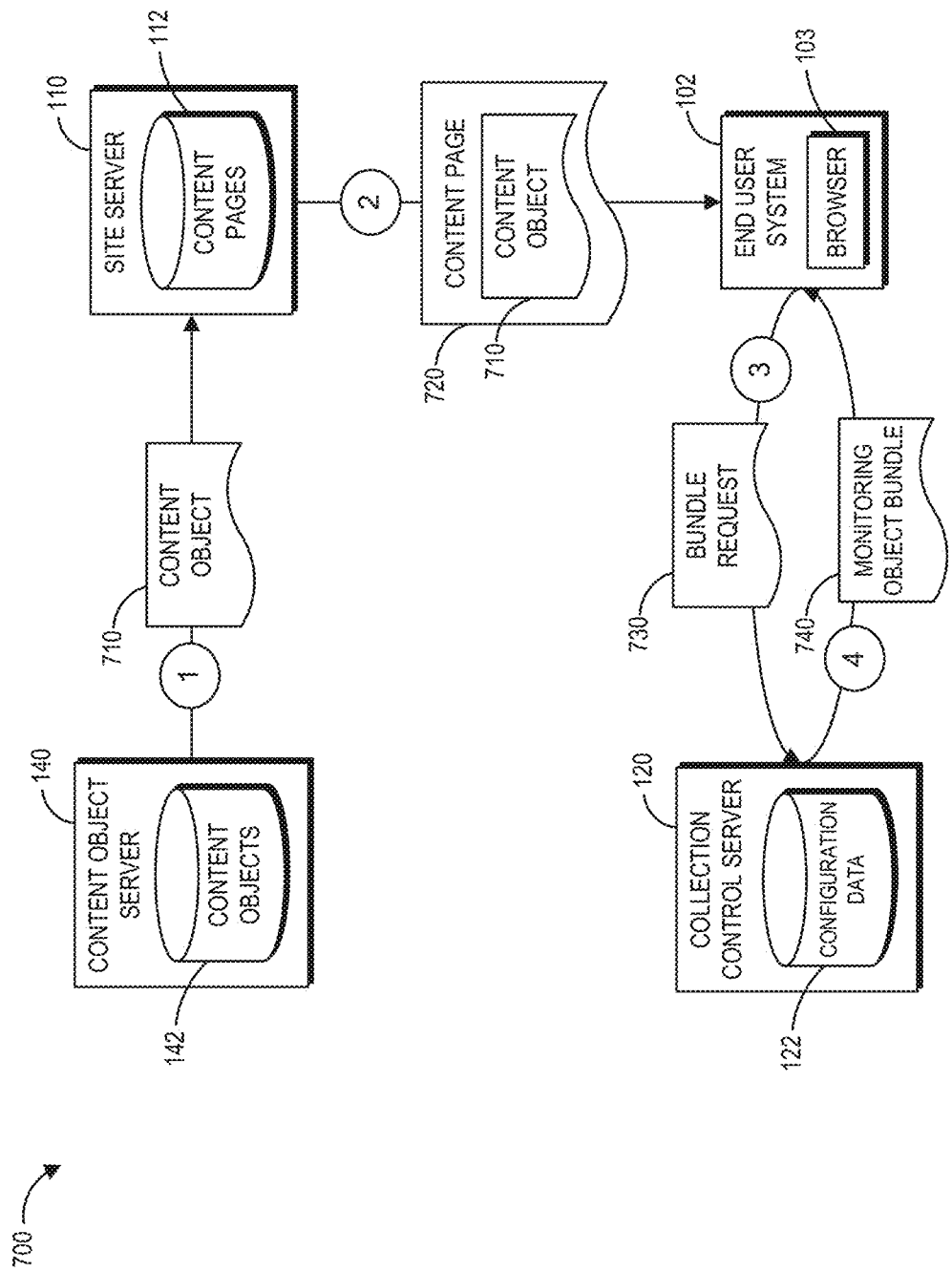
FIG. 7 depicts example communication within the computing environment of FIG. 1.

Turning to FIG. 7, a computing environment 700 is shown that illustrates example communication within the computing environment 100 of FIG. 1.

At communication transmission 1 of FIG. 7, the content object server 140 can transmit a content object 710 from the content objects storage 142 via the network 108 to the site server 110. The content object 710 can include instructions to generate or transmit a bundle request 730, and the instructions to generate or transmit the bundle request 730 can indicate an identifier associated with the content object 710 like an identifier for a group of content objects to which the content object 710 is included (such as provided in the content organization data 220). The content object server 140 may have generated the instructions to generate or transmit the bundle request 730 as described herein and, for instance, using the following load instructions:

var content_id=[Content Server Macro];
    function( )
    load='//tags.tiqcdn.com/utag/account/profile/prod/content_id.js';

The site server 110 can subsequently incorporate the content object 710 into a content page 720 accessed from the content pages storage 112. The content object 710 may have been transmitted to the site server 110 in response to a content object request from the site server 110 to the content object server 140.

At communication transmission 2 of FIG. 7, the site server 110 can transmit the content page 720 that includes the content object 110 to the end user system 102. The browser 103 of the end user system 102 can then load the content page 720 including the content object 710. The content object 710 can include the instructions to generate or transmit the bundle request 730 that indicates the identifier. The content page 720 may have been transmitted to the end user system 102 in response to a content page request from the end user system 102 to the site server 110.

At communication transmission 3 of FIG. 7, the browser 103 can transmit the bundle request 730 to the collection control server 120 via the network 108. The bundle request 730 may have been transmitted in response to the browser 103 loading the content object 710 and, in particular, the instructions to generate or transmit the bundle request 730. The collection control server 120 can receive the bundle request 730 and access or generate a monitoring object bundle 740 based at least on the identifier indicated by the bundle request 730. The monitoring object bundle 740 may, for instance, have been associated with the identifier at the collection control server 120 in advance of the collection control server 120 receiving the bundle request 730 so that the collection control server 120 can determine to access or generate the monitoring object bundle 740 upon receipt of the bundle request 730 indicating the identifier. In one example, the bundle request 730 can be a download query to download the monitoring object bundle 740 from a storage address of the configuration data storage 122 at which the monitoring object bundle 740 is stored.

At communication transmission 4 of FIG. 7, the collection control server 120 can transmit the monitoring object bundle 740 to the end user system 102 via the network 108. The browser 103 can then execute the monitoring object bundle 740 and accordingly gather data indicative of end user interactions with the content object 710, as well as with one or more parts of the content page 720 other than the content object 710. The gathered data can be transmitted to the analytics system 130 or one or more of the collection vendor systems 150 via the network 108.

Figure 8:
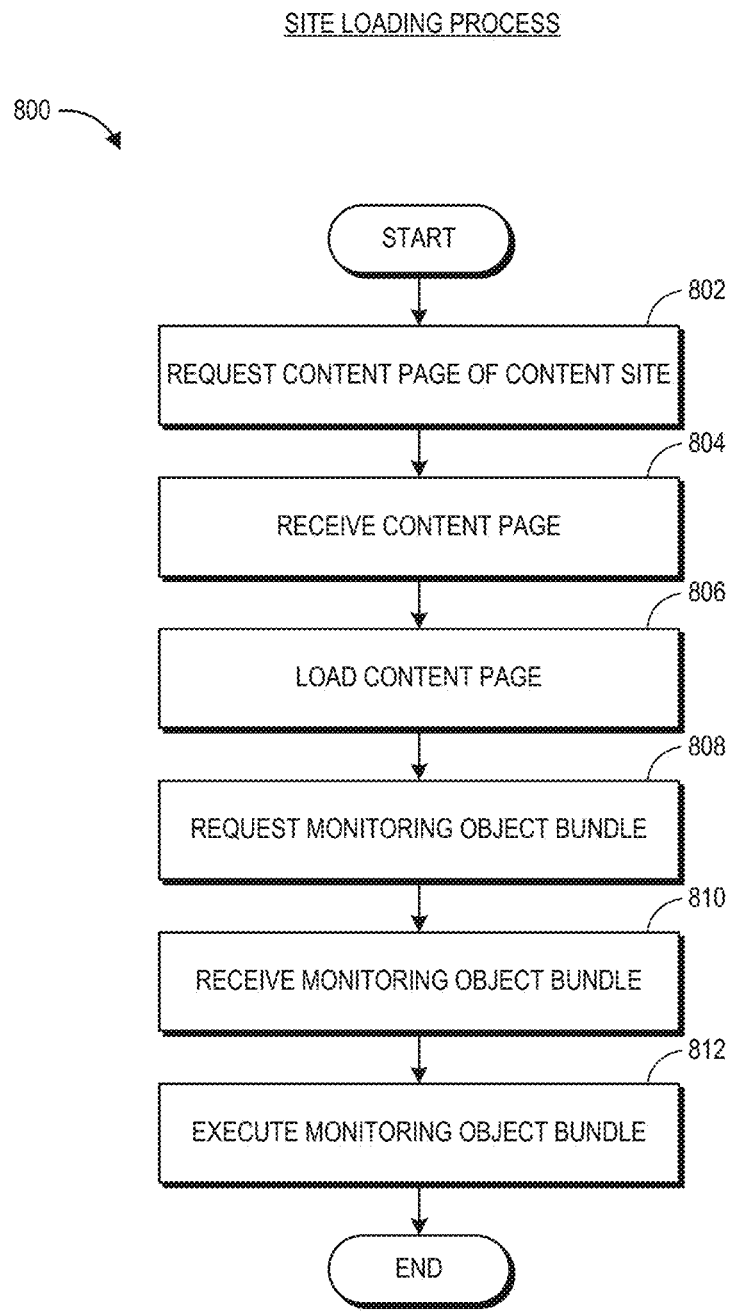
FIG. 8 depicts an example content site loading process.

Turning to FIG. 8, a site loading process 800 is shown. The process 800 illustrates an example mode of operation of the computing environment 100 and may be implemented by the various components shown in the computing environment 100. For convenience, the process 800 is described in the context of the computing environments 100 and 700, but may instead be implemented by other systems described herein or other computing systems not shown. The process 800 provides one example approach by which an end user system can obtain and execute a monitoring object bundle. Advantageously, in certain embodiments, the process 800 can enable the end user system to gather and supply dynamically-sourced user interaction data according to pre-processed instructions from an external server, such as a collection control server.

At block 802, the end user system 102 can request a content page of a content site. The browser 103 can, for instance, request the content page via the network 108 from the site server 110. The content page can be requested as a result of the end user of the end user system 102 directing the browser 103 to navigate to the content page.

At block 804, the end user system 102 can receive the content page. The browser 103 can, for example, receive the content page from the site server 110 via the network 108. The content page can be received by the end user system 102 in response to the request at block 802. The content page can include a content object. The content object can, in turn, include instructions to generate or transmit a bundle request to the collection control server 120 or the analytics system 130.

At block 806, the browser 103 can load the content page. At block 808, the end user system 102 can request a monitoring object bundle. The browser 103 can, for instance, generate or transmit the bundle request via the network 108 in accordance with the instructions included in the content object and as a result of loading and executing the instructions included in the content object. The bundle request can include an identifier associated with the content object that was included in the content page, as described herein.

At block 810, the end user system 102 can receive a monitoring object bundle. The browser 103 can, for example, receive the monitoring object bundle via the network 108. At block 812, the browser 103 can load the monitoring object bundle. Upon loading the monitoring object bundle, the browser 103 can execute the monitoring object bundle to gather and provide data indicative of user interactions with the content object or one or more other portions of the content page.

Figure 9:
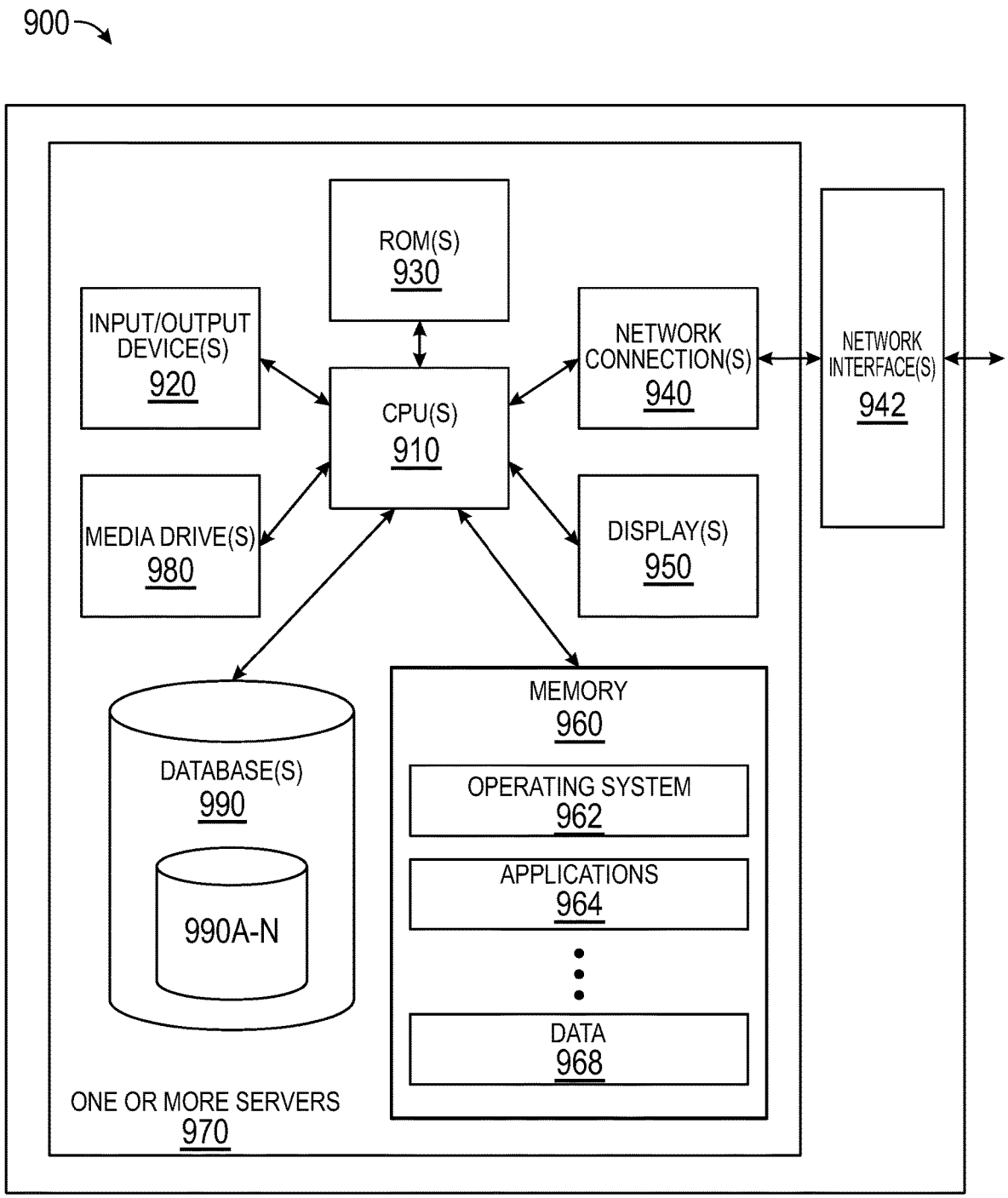
FIG. 9 depicts example system components usable to construct one or more of the systems or servers within the computing environment of FIG. 1.

FIG. 9 illustrates a computer system 900 usable to construct one or more of the systems (for instance, the end user system 102, collection management user system 104, or analytics system 130) or servers (for instance, the site server 110, collection control server 120, and content object server 140) within the computing environment 100 of FIG. 1.

As shown in FIG. 9, system 900 can include (i) one or more processors (CPUs) 910, (ii) an input/output device(s) 920 configured to allow users to input and output information and interact with the system 900 as well as transfer and receive data, (iii) one or more read only memory (ROMs) devices 930 or equivalents to provide nonvolatile storage of data or programs, (iv) one or more displays 950 such as a computer monitor or other display device, (v) one more network connections 940 and associated network interfaces 942 configured to allow the system 900 to connect to other systems, servers or portable devices, as well as one or more memory spaces 960 and one or more databases 990. Database(s) 990 may be further divided or distributed as one or more sub-databases 990a-990n, with the sub-databases storing feature or function specific information associated with a particular feature or function. The various components shown in FIG. 9 may be incorporated in one or more physical servers 970. It is noted that the various components shown in FIG. 9, including database 990, are typically included as part of server(s) 970, however, they may be external to server(s) 970 in some embodiments. For example, database(s) 990 may be external to server(s) 970 and may be part of a separate database server system or networked database system. In some instances, the system may not be a server but rather a computing device like a desktop computer or mobile device.

One or more memory spaces 960 may comprise DRAM, SRAM, FLASH, hard disk drives or other memory storage devices, such as media drives 980, configured to store operating systems 962, application programs or data 964, and one or more memory spaces 960 may be shared with, distributed with or overlap with the memory storage capacity of database 990. In some embodiments, one or more memory spaces 960 may include database 990 or in some embodiments database 990 may include data 968 as shown in memory space 960. Data stored in memory space 960 or database 990 may include information, such as collection configuration management system information or other types of data described herein.

IV. Additional Embodiments and Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines or computing systems that can function together.

In some embodiments, the bundle request transmitted by the end user system 102 can be replaced with a redirect request or delivery of a monitoring object bundle through server-to-server communication. In such embodiments, the monitoring object bundle can include all desired instructions for gathering user interaction data and building the data layer once and may result in a redirect of the user interaction data through the analytics system 130 or the collection control server 120. The user interaction data can subsequently be delivered to the collection vendor systems 150 by the analytics system 130 or the collection control server 120.

The teachings of this disclosure can further extend or relate to a network of physical objects (sometimes referred to as the Internet of Things (IoT)) like devices, vehicles, buildings and other items embedded with electronics, software, sensors, and network connectivity that enables these objects to collect and exchange data. The integration and configurations of such a network to perform the features described herein can generally be the same or similar as for a network of non-physical objects. However, the format of APIs for collection of the content organization data 220 may, in some instances, be different. Moreover, the data collection or monitoring object management for the network of physical objects can be driven by an end object's type, location, format, current state, or device identifier. In one example, different monitoring can be created based at least on device identifiers as associated to a business group. In another example, vehicle identification numbers (VINs) can be used to determine monitoring and data collection for vehicles in a vehicle fleet. In yet another example, regionalized data collection directed can be constructed. In yet a further example, global legal compliance in monitoring can be enforced by limiting monitoring object loading to certain devices, such as those devices that have an Internet Protocol (IP) address within a particular IP address range.

In some embodiments, one or more parts of or all of the analytics system 130 or collection control server 120 can be implemented in a distributed cloud platform that provides redundant or geographically dispersed access (for example, using a Multi-Content Delivery Network). Although not illustrated herein, one such example implementation is described and illustrated with respect to FIG. 25 of U.S. Pat. No. 8,805,946, titled "SYSTEM AND METHOD FOR COMBINING CONTENT SITE VISITOR PROFILES," which was previously incorporated by reference herein in its entirety.

Although the network 108 is shown as one connected network, the network 108 can be subdivided into one or more separate networks which may not directly communicate with one another. For example, the analytics system 130 can communicate with the content object server 140 via a separate and different network from the network that the collection control server 120 uses to communicate with the end user system 102.

The user interface controls shown in FIGS. 3, 5A, 5B, 6A, and 6B are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, the user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed:

1. A system for controlling collection and transmission of data indicative of user interactions with a content object, the system comprising:
   computer-readable storage; and
   one or more processors programmed to:
      receive a bundle request from a user system, the bundle request identifying an identifier of a plurality of identifiers, the plurality of identifiers being associated with a plurality of content objects, the identifier being associated with a first content object and a second content object;
      access a monitoring object bundle using the identifier identified by the bundle request, the monitoring object bundle comprising instructions that when executed by the user system cause the user system to transmit, to a computing system, interaction data indicative of user interactions with the first content object or the second content object; and
      transmit the monitoring object bundle to the user system causing the user system to gather the interaction data and transmit the interaction data to the computing system.

2. The system of claim 1, wherein the one or more processors are programmed to generate the monitoring object bundle.

3. The system of claim 2, wherein the monitoring object bundle is generated in response to receiving the bundle request.

4. The system of claim 2, wherein the one or more processors are programmed to store the monitoring object bundle in the computer-readable storage prior to receiving the bundle request, wherein the monitoring object bundle is accessed from the computer-readable storage.

5. The system of claim 1, wherein the monitoring object bundle is configured so that:
   when the user system loads a first content page that causes loading of the first content object, the monitoring object bundle is requested and processed by the user system and causes the user system to gather and transmit the interaction data indicative of the user interactions with the first content object, and
   when the user system loads a second content page that causes loading of the second content object, the monitoring object bundle is requested and processed by the user system and causes the user system to gather and transmit the interaction data indicative of the user interactions with the second content object.

6. The system of claim 1, wherein the one or more processors are programmed to:
   transmit an identifier request to a content object server to obtain the plurality of identifiers associated with the plurality of content objects; and
   receive the plurality of identifiers associated with the plurality of content objects from the content object server.

7. The system of claim 1, wherein the monitoring object bundle is a data file comprising script language, and the first content object comprises a first image or a first video and the second content object comprises a second image or a second video.

8. A computer-implemented method comprising:
   under control of a computing system comprising one or more computing devices configured to execute specific instructions:
      receiving a bundle request from a user system, the bundle request identifying an identifier of a plurality of identifiers, the plurality of identifiers being associated with a plurality of content objects, the identifier being associated with a first content object and a second content object;
      accessing a monitoring object bundle using the identifier identified by the bundle request, the monitoring object bundle comprising instructions that when executed by the user system cause the user system to transmit, to a computing system, interaction data indicative of user interactions with the first content object or the second content object; and
      transmitting the monitoring object bundle to the user system causing the user system to gather the interaction data and transmit the interaction data to the computing system.

9. The computer-implemented method of claim 8, further comprising generating the monitoring object bundle.

10. The computer-implemented method of claim 9, wherein generating the monitoring object bundle is performed in response to receiving the bundle request.

11. The computer-implemented method of claim 9, further comprising storing the monitoring object bundle in computer-readable storage prior to receiving the bundle request, wherein accessing the monitoring object bundle comprises accessing the monitoring object bundle from the computer-readable storage.

12. The computer-implemented method of claim 9, wherein generating the monitoring object bundle comprises generating the monitoring object bundle so that:
  when the user system loads a first content page that causes loading of the first content object, the monitoring object bundle is requested and processed by the user system and causes the user system to gather and transmit the interaction data indicative of the user interactions with the first content object, and
  when the user system loads a second content page that causes loading of the second content object, the monitoring object bundle is requested and processed by the user system and causes the user system to gather and transmit the interaction data indicative of the user interactions with the second content object.

13. The computer-implemented method of claim 8, further comprising communicating, to a computing apparatus, configuration data indicative of the association of the monitoring object bundle with the first identifier.

14. The computer-implemented method of claim 8, further comprising:
  transmitting an identifier request to a content object server to obtain the plurality of identifiers associated with the plurality of content objects; and
  receiving the plurality of identifiers associated with the plurality of content objects from the content object server.

15. The computer-implemented method of claim 8, wherein the monitoring object bundle is a data file comprising script language, and the first content object comprises a first image or a first video and the second content object comprises a second image or a second video.

16. Non-transitory physical computer storage comprising computer-executable instructions stored thereon that, when executed by one or more processors, are configured to implement a process comprising:
  receiving a bundle request from a user system, the bundle request identifying an identifier of a plurality of identifiers, the plurality of identifiers being associated with a plurality of content objects, the identifier being associated with a first content object and a second content object;
  accessing a monitoring object bundle using the identifier identified by the bundle request, the monitoring object bundle comprising instructions that when executed by the user system cause the user system to transmit, to a computing system, interaction data indicative of user interactions with the first content object or the second content object; and
  transmitting the monitoring object bundle to the user system causing the user system to gather the interaction data and transmit the interaction data to the computing system.

17. The non-transitory physical computer storage of claim 16, wherein the process comprises generating the monitoring object bundle.

18. The non-transitory physical computer storage of claim 17, wherein generating the monitoring object bundle is performed in response to receiving the bundle request.

19. The non-transitory physical computer storage of claim 17, wherein the process comprises storing the monitoring object bundle in computer-readable storage prior to receiving the bundle request, wherein accessing the monitoring object bundle comprises accessing the monitoring object bundle from the computer-readable storage.

20. The non-transitory physical computer storage of claim 16, wherein the monitoring object bundle is configured so that:
  when the user system loads a first content page that causes loading of the first content object, the monitoring object bundle is requested and processed by the user system and causes the user system to gather and transmit the interaction data indicative of the user interactions with the first content object, and
  when the user system loads a second content page that causes loading of the second content object, the monitoring object bundle is requested and processed by the user system and causes the user system to gather and transmit the interaction data indicative of the user interactions with the second content object.

\* \* \* \* \*